United States Patent
Yoon et al.

(10) Patent No.: US 8,081,854 B2
(45) Date of Patent: Dec. 20, 2011

(54) LOW BEND LOSS OPTICAL FIBER

(75) Inventors: Young-Sik Yoon, Daegu (KR);
Yeong-Seop Lee, Gyeongsangbuk-do (KR); Jin-Han Kim, Daegu (KR);
Won-Taek Han, Gwangju (KR);
Seong-Min Joo, Gwangju (KR);
Dea-Hwan Oh, Gyeongsangbuk-do (KR)

(73) Assignees: SEHF-Korea Co., Ltd., Imsu-Dong, Gumi-Si, Gyeong Sangbuk-Do (KR);
Gwangju Institute of Science and Technology, Buk-Gu, Gwangju (KR)

( * ) Notice: Subject to any disclaimer, the term of this patent is extended or adjusted under 35 U.S.C. 154(b) by 0 days.

(21) Appl. No.: 12/638,014

(22) Filed: Dec. 15, 2009

(65) Prior Publication Data

US 2010/0158460 A1 Jun. 24, 2010

(30) Foreign Application Priority Data

Dec. 19, 2008 (KR) .................. 10-2008-0130295
Nov. 18, 2009 (KR) .................. 10-2009-0111472

(51) Int. Cl.
G02B 6/028 (2006.01)
G02B 6/036 (2006.01)

(52) U.S. Cl. ......... 385/124; 385/126; 385/127; 385/128

(58) Field of Classification Search .......... 385/124, 385/126–128
See application file for complete search history.

(56) References Cited

U.S. PATENT DOCUMENTS

| | | | | |
|---|---|---|---|---|
| 6,301,422 B1 * | 10/2001 | Li | .................. | 385/127 |
| 6,856,743 B2 * | 2/2005 | Bickham | .................. | 385/127 |
| 7,088,900 B1 * | 8/2006 | Mishra | .................. | 385/142 |
| 7,272,289 B2 * | 9/2007 | Bickham et al. | .................. | 385/128 |
| 7,570,857 B1 * | 8/2009 | Bickham et al. | .................. | 385/127 |
| 7,603,014 B2 * | 10/2009 | Rathje et al. | .................. | 385/127 |
| 7,676,129 B1 * | 3/2010 | Bookbinder et al. | .................. | 385/123 |
| 2004/0022509 A1 * | 2/2004 | Tandon | .................. | 385/127 |
| 2008/0056654 A1 * | 3/2008 | Bickham et al. | .................. | 385/124 |
| 2008/0056658 A1 * | 3/2008 | Bickham et al. | .................. | 385/127 |
| 2008/0279517 A1 * | 11/2008 | Bickham et al. | .................. | 385/124 |
| 2009/0148113 A1 * | 6/2009 | Bickham et al. | .................. | 385/127 |

FOREIGN PATENT DOCUMENTS

| | | |
|---|---|---|
| EP | 1610161 | 12/2005 |
| JP | 2005-521093 | 7/2005 |
| WO | WO 03/081301 | 10/2003 |

OTHER PUBLICATIONS

Bookbinder, D.C., et al.; Patent Application Publication No. US 2009/0219516 A1; Publication Date: Sep. 3, 2009; "Fiber Optic Sensing System, Method of Using Such and Sensor . . . ;".

Jones, P.C., et al.; Patent Application Publication No. US 2001/046359 A1; Publication Date: Nov. 29, 2001; "Low Attenuation Optical Waveguide."

Blaszyk, Paul E., et al.; Patent Application Publication No. US 2003/0223717 A; Publication Date: Dec. 4, 2003; "Low Bend Loss Optical Fiber and Components Made Therefrom,".

* cited by examiner

*Primary Examiner* — Uyen Chau N Le
*Assistant Examiner* — Chris Chu
(74) *Attorney, Agent, or Firm* — Cha & Reiter, LLC

(57) ABSTRACT

Disclosed is a low bend loss optical fiber including: a core; an inner layer disposed at outside of the core, which has a refractive index lower than a refractive index of the core, the refractive index of the inner layer gradually decreasing as it becomes farther from the core; and a trench layer disposed at outside of the inner layer, which has a lowest refractive index.

9 Claims, 3 Drawing Sheets

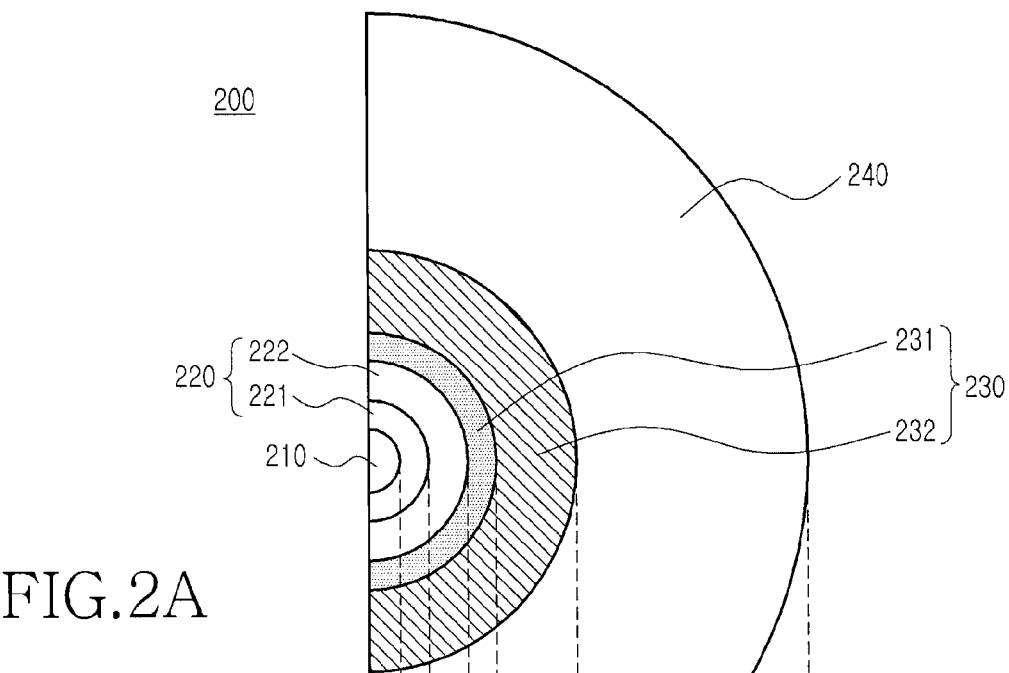
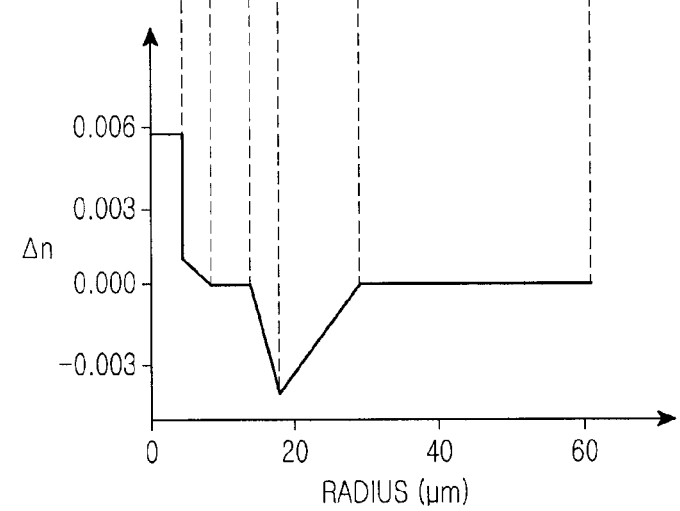
FIG.2A
FIG.2B

LOW BEND LOSS OPTICAL FIBER

CLAIM OF PRIORITY

This application claims priority to application entitled "Low Bend Loss Optical Fiber" filed with the Korean Intellectual Property Office on Dec. 19, 2008 and assigned Serial No. 10-2008-0130295, and an application entitled "Low Bend Loss Optical Fiber" filed with the Korean Intellectual Property Office on Nov. 18, 2009 and assigned Serial No. 10-2009-0111472, the contents of both being incorporated herein by reference.

BACKGROUND OF THE INVENTION

1. Field of the Invention

The present invention relates to an optical fiber, and more particularly to a low bend loss optical fiber.

2. Description of the Related Art

As an FTTH (Fiber To The Home) subscriber transmission service network of 100 Mbps or more has been recently built, and the related service industries have been activated, the demand for an optical fiber with an enhanced bend resistance for broadband transmission is rapidly increased.

A general passive optical network (PON) for building FTTH includes an optical line terminal (OLT) positioned at the side of a central office (CO), an optical network unit (ONU) or an optical network termination (ONT) positioned at a user home apparatus or around the apparatus, and a remote node (RN) provided with a splitter or a wavelength division multiplexer (WDM) for connecting these in a tree topology. The CO and the RN, and the RN and the multiple ONUs are generally interconnected by a low water peak fiber (LWPF; a broadband transmission optical fiber). Also, by using a lead-in optical cable, a feeder point, such as an electric pole, is connected to the home lead-in hole. Herein, as the lead-in optical cable, a bending insensitive fiber with an enhanced bend resistance appropriate for the installation indoor/outdoor is mainly used. In actuality, compared to general optical characteristics (such as loss, and dispersion), the installation, and the bend loss occurring by a physical external force in the field using an optical fiber are main factors in largely restricting home network construction. When such a bend loss property is worsened, a problem may be caused in the optical loss and data transmission.

As described above, communications networks using optical fibers have an advantage in that a large amount of data can be transmitted at a high speed in a short period. Meanwhile, the communications networks have a problem in that optical fibers are damaged due to external physical force, and optical loss and a problem of data transmission can occur because of the damage to the optical fibers.

Optical fibers, which include a core and a clad, which has a refractive index significantly different from that of the core and is disposed around the core so that optical loss due to physical force, such as bending, etc., is minimized, is known in the art. There are disclosed the above described type optical fibers, including holey optical fibers manufactured by companies, such as Sumitomo, NTT, etc, or optical fibers having a fine bubble nano structure manufactured by Corning corp., or optical fibers, which have a ring trench clad refractive index profile and are manufactured by for example OFS.

The holey optical fibers are excellent in view of the bending loss. However, they have a problem in that they require high manufacturing cost due to a complicated manufacturing process. Further, it is difficult to connect the holey optical fibers with typical optical fibers of G652 standards, and the holey optical fibers have large optical loss. Also, optical fibers manufactured by Corning corp. have problems with regard to mechanical strength, splicing loss, and a difficult splicing method, which may be caused by a fine bubble nano structure.

However, conventional optical fibers with a ring-trench clad structure have a stable structure and relatively superior characteristics, such as splicing loss, mechanical strength, etc in comparison with the above-described optical fibers. However, there is a problem in that the conventional optical fibers have comparatively inferior optical characteristics in optical loss due to bending.

SUMMARY OF THE INVENTION

The present invention provides optical fibers and a method for manufacturing the same, which can minimize optical loss due to damage by external physical force, such as bending, etc.

In accordance with an aspect of the present invention, there is provided a low bend loss optical fiber including: a core; an inner layer disposed at outside of the core, which has a refractive index lower than a refractive index of the core, the refractive index of the inner layer gradually decreasing as it becomes farther from the core; and a trench layer disposed at outside of the inner layer, which has a lowest refractive index.

In accordance with another aspect of the present invention, there is provided a low bend loss optical fiber including: a core; an inner layer disposed at outside of the core, which has a refractive index lower than a refractive index of the core; and a trench layer disposed at outside of the inner layer, which has a lowest refractive index, and has a portion where a refractive index gradually increases as it becomes farther from the core.

Optical fibers according to the present invention include a clad having a graded refractive index distribution and a trench layer so that the optical fibers can minimize the amount of optical loss due to refractive index change and bending.

The trench structure of the present invention minimizes mode transmission in the clad by minimizing a change in a refractive index of a single-mode optical fiber. Also, since the optical fiber is constructed in such a manner that the refractive index of a trench layer gradually increases or decreases, it is possible to minimize a wideband bend loss.

Also, through the trench structure with the graded refractive index distribution, a large-diameter trench layer can be achieved. Besides, the stress caused by such a large-diameter structure can be minimized, and the trench layer may have an entire volume smaller than a conventional round ring structure.

Also, the optical fiber according to the present invention can minimize even a leaky mode dispersion caused by bending. Besides, through a short cut-off wavelength, it is possible to obtain a wideband low bend loss optical fiber whose bend loss difference is not high in a wide wavelength range of C-band and L-band.

BRIEF DESCRIPTION OF THE DRAWINGS

The above and other exemplary features, aspects, and advantages of the present invention will be more apparent from the following detailed description taken in conjunction with the accompanying drawings, in which:

FIGS. 2A and 2B are a sectional view of an optical fiber and a refractive index profile of the optical fiber, according to a preferred second embodiment the present invention.

DETAILED DESCRIPTION OF THE EXEMPLARY EMBODIMENTS

Exemplary embodiments of the present invention will be described with reference to the accompanying drawings. Further, in the following description of the present invention, a detailed description of known functions and configurations incorporated herein will be omitted when it may make the subject matter of the present invention rather unclear.

Figure 1A:
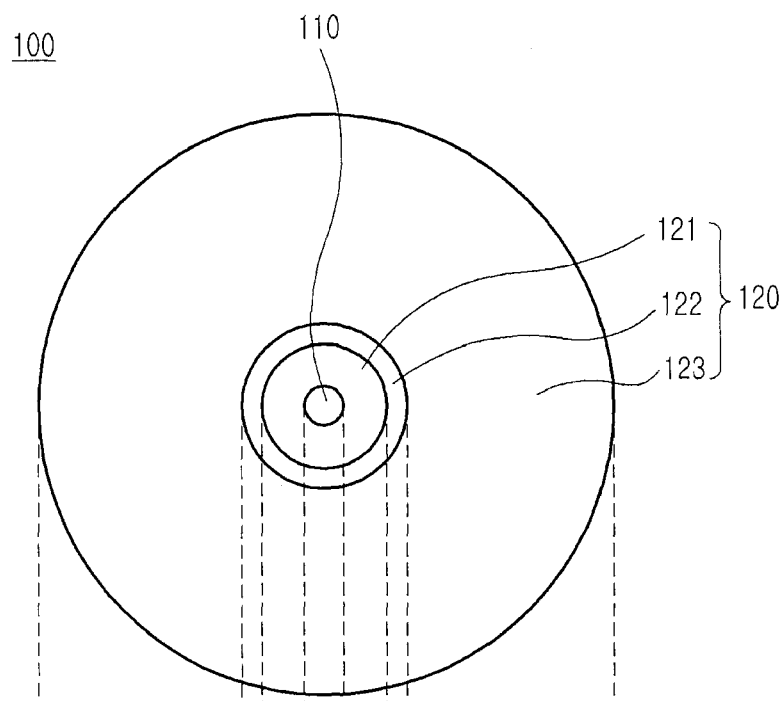
FIGS. 1A and 1B are a sectional view of an optical fiber and a refractive index profile of the optical fiber, according to a preferred first embodiment the present invention.
Figure 1B:
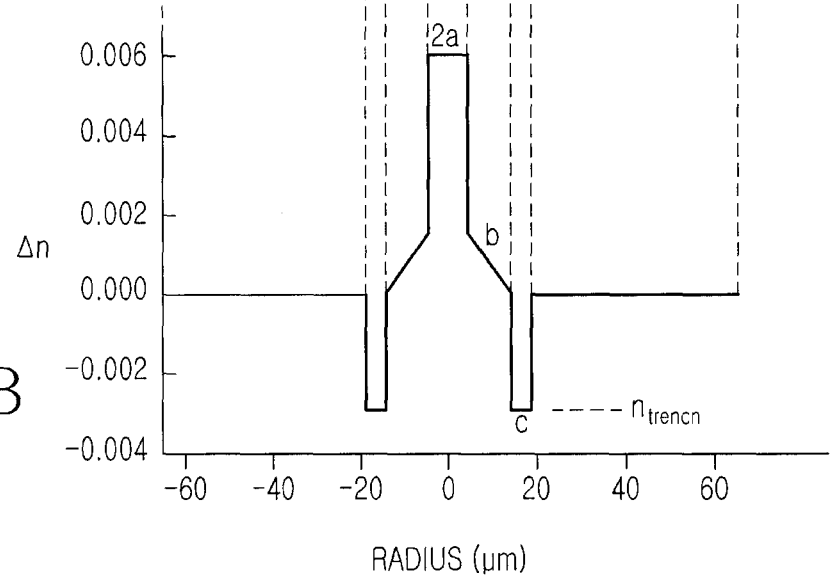

FIG. 1A is a sectional view of an optical fiber according to a first embodiment of the present invention, and FIG. 1B is a graph showing a refractive index profile according to the section of the optical fiber shown in FIG. 1A. Referring to FIG. 1, an optical fiber 100 includes a core 110 and a clad 120. The core 110 is provided at the center of the optical fiber, has a relatively high refractive index, and is for optical signal transmission through total internal reflection. The clad 120 is disposed at the outside of the core 110, and has a relatively low refractive index. In other words, the clad 120 is disposed in such a manner that it can fully surround the core 110 along the circumference of the core 110. The core 110 takes a cylindrical rod shape, and the clad 120 takes a round tube shape. The core 110 and the clad 120 are concentrically disposed.

The core 110 has a refractive index difference ($\Delta n$), which is in the range from 0.0040 to 0.0065. However, it is further preferred that the refractive index difference is in the range from 0.0045 to 0.0060. Moreover, a diameter $2a$ of the core 110 may be in the range from 6.0 μm to 9.5 μm (microns). However, it is further preferred that the diameter is in the range from 8.0 μm to 9.0 μm. For example, the refractive index difference of the core 110 is defined as a difference between a refractive index of the core 110 and a refractive index of an outer layer 123.

The clad 120 includes an inner layer 121, which has a refractive index gradually decreasing as it becomes farther from the core 110, the outer layer 123 having a refractive index equal to the lowest refractive index of the inner layer 121, and a trench layer 122, which is positioned between the inner layer 121 and the outer layer 123 and has the lowest refractive index among respective refractive indexes of the layers included in the optical fiber 100. In other words, the inner layer 121, the trench layer 122, and the outer layer 123 are directly sequentially deposited on the outer circumference of the core 110, take round tube shapes, respectively, and are concentrically disposed together with the core 110.

The inner layer 121 has a graded refractive index profile structure and has a refractive index gradually decreasing from an inner circumference of the inner layer, which is in contact with the core 110, toward an outer circumference thereof. As exemplified, the inner layer 121 has a refractive index distribution with a refractive index linearly decreasing from the inner circumference to the outer circumference. The refractive index difference of the inner layer 121 may be in the range from −0.001 to 0.003. It is preferred that the refractive index difference between the inner circumference and the outer circumference of the inner layer 121, which is required for minimizing optical loss by bending, is in the range from 0.0000 to 0.0015.

A thickness (b) of the inner layer 121 based on a position in contact with the core may be 16 μm, 8.4 μm, or 1.78×a (a is the radius of the core) or less. It may be further preferred that the thickness "b" is set to be 5.8 μm or 1.2×a or less.

The trench layer 122 surrounds the inner layer 121 and has the lowest refractive index among the respective refractive indexes of the layers included in the optical fiber 100. That is, it is preferred that the refractive index difference of the trench layer 122 is −0.003 or less. Also, a thickness c of the trench layer 122 may be 14 μm, 9.6 μm, or 2×a or less. However, it is preferred that the thickness is 7.2 μm or 1.5×a or less.

In general, a multi-mode optical fiber has a refractive-index profile with a parabolic shape so as to reduce the amount of mode dispersion. Also, distribution of refractive indexes is changed with a shape where the refractive indexes are gradually reduced from the center toward the outer circumference. Therefore, light of a long mode is faster than light of a short mode so that mode distribution can be minimized. Meanwhile, in a case of a single-mode optical fiber, mode dispersion can be removed by reducing the number of modes into one through control of the core diameter and the refractive index of the optical fiber. Therefore, theoretically, mode dispersion can have a value of 0, and only waveguide dispersion exists.

If bending occurs in the optical fiber 100, a leaky mode exists due to the change of a refractive index of a cladding area, and thereby, optical loss increases so that long distance transmission is impossible. In order to achieve long distance transmission of single-mode optical fibers by minimizing bending loss, there is a need for minimizing the change of the refractive index of the cladding area according to the bending.

The optical fiber 100 has the clad 120 including the inner layer 121, which has a graded refractive index profile and a refractive index gradually decreasing from an inner circumference in contact with the core 110, toward an outer circumference thereof, and the trench layer 122 having the lowest refractive index so that the optical fiber can minimize optical loss and dispersion of leaky mode, which may be caused by bending, etc.

The outer layer 123 surrounds the trench layer 122 and has a refractive index, which is higher than that of the trench layer 122 and is lower than that of the core 110.

FIG. 2A is a sectional view of an optical fiber 200 according to a second embodiment of the present invention, and FIG. 2B is a graph showing a refractive index profile according to the section of the optical fiber shown in FIG. 2A. The optical fiber 200 in the second embodiment has a similar structure to that in the first embodiment, except that there is a difference between the first and second embodiments in an inner layer 220 and a trench layer 230. Therefore, repetitive description thereof is omitted.

Referring to FIG. 2, the optical fiber 200 includes a core 210 and a clad 215. The core 210 is disposed at the center of the optical fiber 200, has a relatively high fixed (i.e., constant) refractive index, and is for optical signal transmission through total internal reflection. The clad 215 is disposed at the outside of the core 210, and has a relatively low refractive index. In other words, the clad 215 is disposed in such a manner that it can fully surround the core 210 along the circumference of the core 210. The core 210 takes a cylindrical rod shape, and the clad 215 takes a round tube shape. The core 210 and the clad 215 are concentrically disposed.

The clad 215 includes an inner layer 220, which has a refractive index gradually decreasing as it becomes farther from a position adjacent to the core 210, the outer layer 240 having a refractive index equal to the lowest refractive index of the inner layer 220, and a trench layer 230, which is positioned between the inner layer 220 and the outer layer 240 and has the lowest refractive index among respective refractive indexes of the layers included in the optical fiber 200. In other words, the inner layer 220, the trench layer 230, and the outer layer 240 are directly sequentially deposited on the outer circumference of the core 210, take round tube shapes, respectively, and are concentrically disposed, together with the core 210.

The inner layer 220 includes a first inner sub layer 221 and a second inner sub layer 222, and the first and second inner sub layers 221 and 222 are directly sequentially layered on the outer circumference of the core 210, take round tube shapes, respectively, and are concentrically disposed, together with the core 210.

The first inner sub layer 221 has a graded refractive index profile structure in which a refractive index gradually decreases from the inner circumference in contact with the outer circumference of the core 210, toward the outer circumference. The inner circumference refractive index of the first inner sub layer 221 is smaller than the refractive index of the core 210 and is larger than the refractive index of the outer layer 240. The outer circumference refractive index of the first inner sub layer 221 is the same as the refractive index of the outer layer 240. As exemplified, the first inner sub layer 221 has a refractive index distribution with a refractive index linearly decreasing from the inner circumference to the outer circumference. Also, the second inner sub layer 222 has a fixed refractive index, which is the same as the outer circumference refractive index of the first inner sub layer 221.

The trench layer 230 includes a first trench sub layer 231 and a second trench sub layer 232, and the first and second trench sub layers 231 and 232 are directly sequentially layered on the outer circumference of the inner layer 220, take round tube shapes, respectively, and are concentrically disposed, together with the core 210, and the inner layer 220. The trench layer 230 has a graded refractive index distribution in which a refractive index gradually decreases and then increases from the inner circumference toward the outer circumference.

The first trench sub layer 231 has a graded refractive index distribution in which a refractive index gradually decreases from the inner circumference in contact with the outer circumference of the second inner sub layer 222, toward the outer circumference. The inner circumference refractive index of the first trench sub layer 231 is the same as the refractive index of the second inner sub layer 222, and the outer circumference refractive index of the first trench sub layer 231 is smaller than the refractive index of the outer layer 240. As exemplified, the first trench sub layer 231 has a refractive index distribution with a refractive index linearly decreasing from the inner circumference to the outer circumference.

The second trench sub layer 232 has a graded refractive index distribution in which a refractive index gradually increases from the inner circumference in contact with the outer circumference of the first trench sub layer 231, toward the outer circumference. The inner circumference refractive index of the second trench sub layer 232 is the same as the outer circumference refractive index of the first trench sub layer 231, and the outer circumference refractive index of the second trench sub layer 232 is the same as the refractive index of the outer layer 240. As exemplified, the second trench sub layer 232 has a refractive index distribution with a refractive index linearly increasing from the inner circumference to the outer circumference. Herein, the slope of a refractive index curve on the second trench sub layer 232 is smaller than the slope of a refractive index curve on the first trench sub layer 231. In other words, in the first trench sub layer 231, the refractive index is relatively sharply changed, while in the second trench sub layer 232, the refractive index is relatively gently changed.

The outer layer 240 surrounds the trench layer 230, and has the same refractive index as conventional silica glass (for example, 1.456).

In the optical fiber 200 of the second embodiment, since the second trench sub layer 232 having a gradually increasing refractive index distribution is disposed within the trench layer 230, the amount of optical loss due to refractive index change and bending may be minimized.

In the first embodiment, as the thickness of the trench layer 122 increases, a refractive index difference of the optical fiber 100 increases and a bend resistance is enhanced. However, a large-diameter trench structure causes higher-order modes of LP11 or more, thereby increasing a cut-off wavelength of the optical fiber 100. Herein, the cut-off wavelength means a wavelength as a boundary of a single mode from a multi mode. Also, when the thickness of the trench layer 122 is larger than a predetermined value, the cut-off wavelength is out of the range in accordance with G652 standards (1260 nm).

A calculation equation for a normalized frequency V corresponding to the cut-off wavelength is as follows.

$$V = \frac{2\pi a}{\lambda} n_1 \sqrt{2\Delta} \qquad \text{[Formula 1]}$$

In Formula 1, $\lambda$ represents a in-use wavelength, a represents a diameter of the core, n1 represents a refractive index of the core, and $\Delta$ represents a refractive index difference between the core and the clad.

For example, in consideration of that an effective refractive index of a fluorine containing-optical fiber construction area has a constant value which is not changed according to a in-use wavelength, it can be known that from Formula 1, the value of V is high at a short wavelength.

However, as described above, in the second embodiment, a sharp refractive index change is provided to the boundary area (that is, the first trench sub layer 231) between the inner layer 220 and the trench layer 230, and a gentle refractive index change is provided to the area (the second trench sub layer 232) from the lowest refractive index point to the boundary of the outer layer 240, so as to enhance the bend resistance. Thus, the trench layer 230 may have an entire thickness or volume smaller than a conventional round ring structure, while the refractive index difference may be increased.

The trench layer 230 having such a graded refractive index distribution provides a shorter cut-off wavelength than the trench layer 122 of the first embodiment, and thus it is possible to obtain a wideband low bend loss optical fiber 200 whose bend loss difference is not high in a wide wavelength range of C-band and L-band.

The refractive index distribution of the optical fiber 200, as shown, may optimize the wideband bend loss property, while minimizing stress added to the optical fiber 200.

Figure 3A:
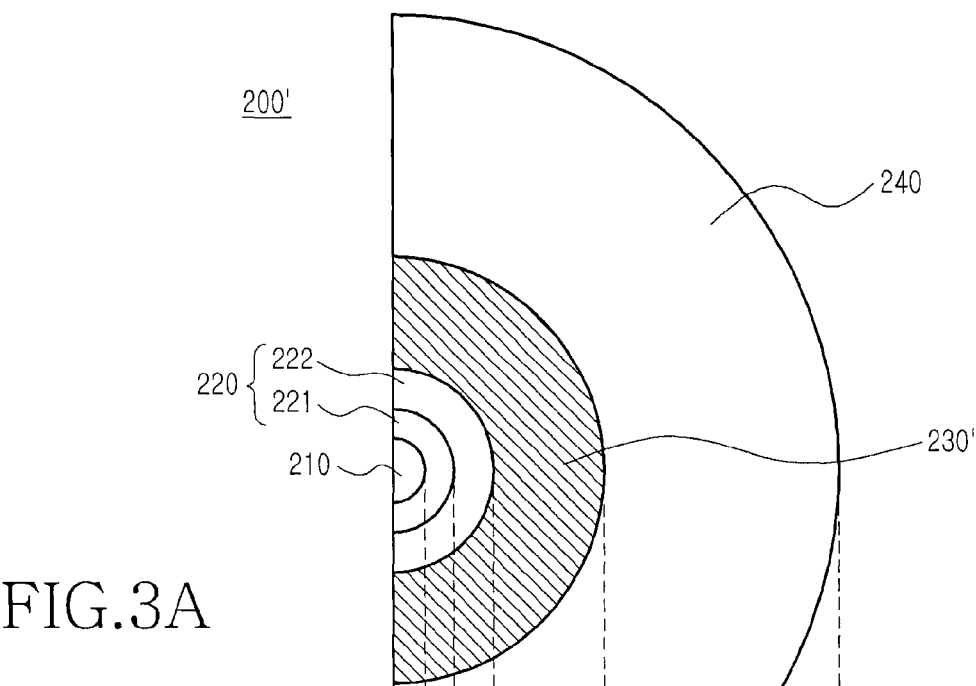
FIGS. 3A and 3B are a sectional view of an optical fiber and a refractive index profile of the optical fiber, according to a preferred third embodiment the present invention.
Figure 3B:
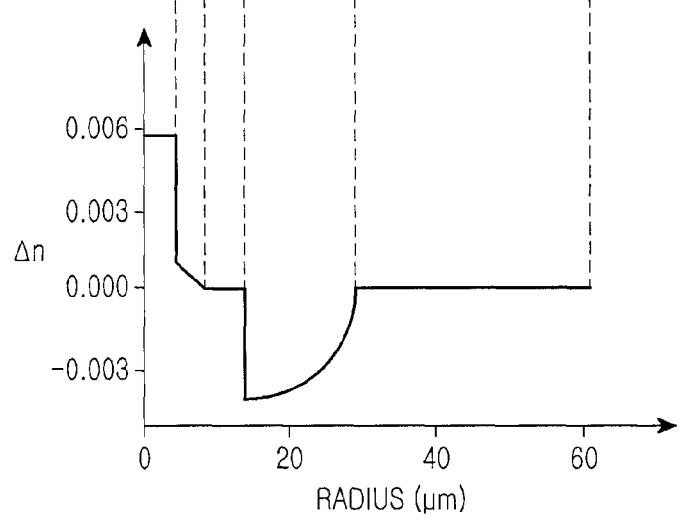

FIG. 3A is a sectional view of an optical fiber 200' according to a third embodiment of the present invention, and FIG. 3B is a graph showing a refractive index profile according to the section of the optical fiber shown in FIG. 3A. The optical fiber 200' in the third embodiment has a similar structure to that in the second embodiment, except that there is a difference between the second and third embodiments in a trench layer 230'. Therefore, repetitive description thereof is omitted, and only the trench layer 230' will be described.

The trench layer 230' is directly deposited on the outer circumference of the inner layer 220, takes a round tube shape, and is concentrically disposed, together with the core 210, and the inner layer 220. The trench layer 230' has a graded refractive index distribution in which a refractive index non-linearly increases from the inner circumference toward the outer circumference. Herein, from the inner circumference toward the outer circumference, the slope angle of a refractive index curve changes from 0 to 90 degrees. The inner circumference refractive index of the trench layer 230' is smaller than the refractive index of the outer layer 240, and the outer circumference refractive index of the trench layer 230' is the same as the refractive index of the outer layer 240.

Tables 1 to 3 below show embodiments of the process of manufacturing core basic material used for manufacturing an optical fiber according to the present invention.

Table 1 below shows an embodiment of the process of manufacturing core basic material by using tetrafluoromethane $CF_4$.

TABLE 1

| Process | Hours | $SiCl_4$ (slpm) | $GeCl_4$ (slpm) | $POCl_3$ (slpm) | $CF_4$ (slpm) | He (slpm) | $O_2$ (slpm) | $Cl_2$ (slpm) |
|---|---|---|---|---|---|---|---|---|
| Polishing | 2 | 0 | 0 | 0 | 20 | 3000 | 2000 | 0 |
| Outer layer | 5 | 860 | 220 | 28 | 10 | 3000 | 350 | 0 |
| Trench | 12 | 860 | 0 | 28 | 110 + 2.5/p | 3000 | 350 | 0 |
| Sintering | 1 | 0 | 0 | 0 | 0 | 3000 | 500 | 400 |
| Inner layer | 8 | 860 − 15/p | 120 + 4.3/p | 28 | 0 | 3000 | 350 | 0 |
| core | 14 | 210 − 15/p | 450 − 8.9/p | 0 | 0 | 1000 | 500 | 0 |
| Sintering | 5 | 0 | 0 | 0 | 0 | 3000 | 500 | 400 |
| Collapse | 10 | 0 | 0 | 0 | 0 | 0 | 420 | 350 |
| Close | 1 | 0 | 0 | 0 | 0 | 0 | 0 | 200 |

Table 2 below shows an embodiment of a process of manufacturing core basic material by using $CF_4$ and germanium tetrachloride $GeCl_4$.

TABLE 2

| Process | Hours | $SiCl_4$ | $GeCl_4$ | $POCl_3$ | $CF_4$ | He | $O_2$ | $Cl_2$ |
|---|---|---|---|---|---|---|---|---|
| Polishing | 2 | 0 | 0 | 0 | 20 | 3000 | 2000 | 0 |
| Outer layer | 5 | 860 | 220 | 28 | 10 | 3000 | 350 | 0 |
| Trench | 12 | 860 | 0 | 28 | 100 + 2.5/p | 3000 | 350 | 0 |
| Sintering | 1 | 0 | 0 | 0 | 0 | 3000 | 500 | 400 |
| Inner layer | 8 | 860 − 15/p | 180 + 4.3/p | 28 | 25 | 3000 | 350 | 0 |
| core | 14 | 210 − 5/p | 450 − 8.9/p | 0 | 0 | 1000 | 500 | 0 |
| Sintering | 5 | 0 | 0 | 0 | 0 | 3000 | 500 | 400 |
| Collapse | 10 | 0 | 0 | 0 | 0 | 0 | 420 | 350 |
| Close | 1 | 0 | 0 | 0 | 0 | 0 | 0 | 200 |

Table 3 below shows an embodiment of a process of manufacturing core basic material by using $BCl_3$.

TABLE 3

| Process | Hours | $SiCl_4$ | $GeCl_4$ | $POCl_3$ | $CF_4$ | $BCl_3$ | He | $O_2$ | $Cl_2$ |
|---|---|---|---|---|---|---|---|---|---|
| Polishing | 2 | 0 | 0 | 0 | 20 | 0 | 3000 | 2000 | 0 |
| Outer layer | 5 | 860 | 220 | 28 | 10 | 0 | 3000 | 350 | 0 |
| Trench | 12 | 860 | 0 | 28 | 180 + 2.5/p | 45 | 3000 | 350 | 0 |
| Sintering | 1 | 0 | 0 | 0 | 0 | 0 | 3000 | 500 | 400 |
| Inner layer | 8 | 860 − 15/p | 180 + 4.3/p | 28 | 0 | 0 | 3000 | 350 | 0 |
| Core | 14 | 210 − 5/p | 450 − 8.9/p | 0 | 0 | 0 | 1000 | 500 | 0 |
| Sintering | 5 | 0 | 0 | 0 | 0 | 0 | 3000 | 500 | 400 |
| Collapse | 10 | 0 | 0 | 0 | 0 | 0 | 0 | 420 | 350 |
| Close | 1 | 0 | 0 | 0 | 0 | 0 | 0 | 0 | 200 |

Tables 1 to 3 above show conditions for the process of manufacturing core basic material used for optical fibers according to the present invention. The core basic material manufacturing processes shown above are based on a substrate tube having the size of Φ31×Φ36×11200 (mm)

Soot is deposited on the outer circumference of core material manufactured by the manufacturing processes shown in Tables 1 to 3 above by using a deposition torch, to which fuel material and fuel gas is supplied. When the soot has been deposited on the core material with a predetermined outer diameter and a weight, the depositing is finished. Then, the core material is slowly cooled, and is subjected to sintering and vitrifying.

Then, the soot, which is a porous layer of an outer clad, is vitrified through sintering and vitrifying. It takes in the order of 300 minutes to perform the vitrifying process under an atmosphere of 0.375 slpm of $Cl_2$ and 15 slpm of He and a temperature of 1500 degs. The sintering process may be processed at a temperature of 1550 to 1650 deg and under a vacuous state of $1×10^{-2}$ torr. It is preferred that 0 to about 15 slpm of He is injected during the sintering process. The completely manufactured optical fiber basic material may have an outer diameter of 80 mm and a length of 1200 mm.

The outer clad layer, which is deposited outside of the above described core material, sintered, and vitrified, may be substituted by over jacketing.

The optical fiber basic material, which is completely manufactured through the above described vitrifying process, is drawn from a draw tower as optical fibers, and optical fibers manufactured through this procedure have an MFD (at 1310 nm) of 8.9 μm and a zero dispersion wave length of 1320 nm.

When the optical fiber is bent with a diameter of 10 mm, the optical fiber has an optical bending loss of 0.01 dB/turn at a wavelength of 1310 nm; 0.02 dB/turn at a wave length of 1320 nm; 0.05 dB/turn at a wavelength of 1550 nm; and 0.14 dB/turn at a wave length of 1625 nm.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A low bend loss optical fiber comprising:
    a core;
    an inner layer, disposed outside of, and adjacent, the core, having a refractive index lower than a refractive index of the core, the refractive index of the inner layer gradually decreasing from an inner circumference of the inner layer as a distance from the core increases;
    a trench layer, disposed outside of, and adjacent, the inner layer, having a lowest refractive index; and
    an outer layer, disposed outside of, and adjacent, the trench layer, having a refractive index that is higher than the lowest refractive index of the trench layer and lower than the refractive index of the core,
    wherein the refractive index of the trench layer continuously changes from an outer circumference of the inner layer to an inner circumference of the outer layer without maintaining constant in the refractive index of the trench layer, and the trench layer comprises:
        a first trench sub layer whose refractive index decreases continuously and linearly at a constant slope as a distance from the core increases; and
        a second trench sub layer, adjacent the first trench sub layer, having a refractive index that increases continuously and linearly at a constant slope as the distance from the core increases.

2. The low bend loss optical fiber as claimed in claim 1, wherein the inner layer comprises:
    a first inner sub layer whose refractive index gradually decreases as a distance from the core increases; and
    a second inner sub layer, adjacent to the first inner sub layer, having a fixed refractive index.

3. The low bend loss optical fiber as claimed in claim 1, wherein a refractive index difference between the core and the inner layer is in a range from 0.0040 to 0.0065.

4. The low bend loss optical fiber as claimed in claim 1, wherein a diameter of the core is in a range from 6.0 μm to 9.5 μm.

5. The low bend loss optical fiber as claimed in claim 1, wherein a refractive index difference of the inner layer and the trench layer is in a range from −0.001 to 0.003.

6. The low bend loss optical fiber as claimed in claim 1, wherein a thickness of the inner layer is 16 μm or less.

7. The low bend loss optical fiber as claimed in claim 1, wherein a refractive index difference between the trench layer and the outer layer is −0.003 or less.

8. The low bend loss optical fiber as claimed in claim 1, wherein a thickness of the trench layer is 14 μm or less.

9. The low bend loss optical fiber as claimed in claim 1, wherein the low bend loss optical fiber has a bending loss of 1.0 dB/turn or less at wavelengths of 1550 nm and 1625 μm when the low bend loss optical fiber is bent with a radius of 5 mm.

* * * * *

UNITED STATES PATENT AND TRADEMARK OFFICE
CERTIFICATE OF CORRECTION

PATENT NO. : 8,081,854 B2  Page 1 of 1
APPLICATION NO. : 12/638014
DATED : December 20, 2011
INVENTOR(S) : Young-Sik Yoon et al.

It is certified that error appears in the above-identified patent and that said Letters Patent is hereby corrected as shown below:

Column 10, Claim 9, Line 32, after "at" should read as follows
--...wavelengths of 1550 nm and 1625 nm...--

Signed and Sealed this
Fourteenth Day of August, 2012

David J. Kappos
*Director of the United States Patent and Trademark Office*